Figure 1:
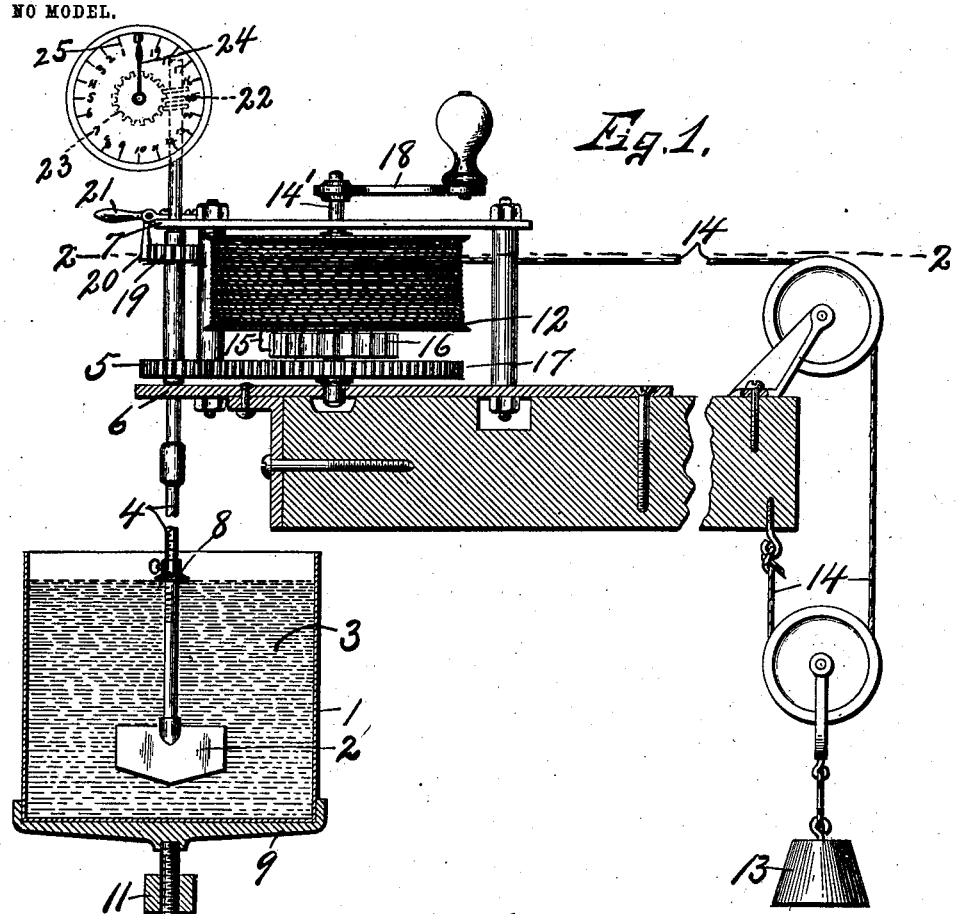

No. 722,576. PATENTED MAR. 10, 1903.
S. GRAND.
VISCOSIMETER.
APPLICATION FILED JULY 30, 1902.
NO MODEL.

WITNESSES:
F. E. Arthur,
H. E. Chase,

INVENTOR
Samuel Grand
BY
Smith & Davidson
ATTORNEYS.

UNITED STATES PATENT OFFICE.

SAMUEL GRAND, OF FULTON, NEW YORK.

VISCOSIMETER.

SPECIFICATION forming part of Letters Patent No. 722,576, dated March 10, 1903.

Application filed July 30, 1902. Serial No. 117,666. (No model.)

*To all whom it may concern:*

Be it known that I, SAMUEL GRAND, of Fulton, in the county of Oswego, in the State of New York, have invented new and useful Improvements in Viscosimeters, of which the following, taken in connection with the accompanying drawings, is a full, clear, and exact description.

This invention relates to improvements in viscosimeters.

The object of my improvement is to determine the viscosity of the liquid by means of a moving body immersed in the liquid and acting against the inertia of said liquid, so that the resistance offered by this inertia may be accurately measured.

Another object is to provide means for regulating the depth of the immersion of the moving body in the liquid, whereby the moving body may be immersed a uniform distance in different liquids in testing the viscosity of the same.

To this end the invention consists in the combination, construction, and arrangement of the parts of a device for determining the viscous properties of liquids, as hereinafter fully described, and pointed out in the claims.

In the preparation and manufacture of the various liquid foods and other viscous liquids it is highly essential that the precise density or viscosity of the liquid be accurately determined, and when these liquids are manufactured in large quantities it becomes necessary to provide some simple and practical means for accomplishing this result speedily and accurately. By repeated experiments I have found that the simplest and most efficient means for carrying out the objects of my invention is to provide a blade, paddle, or similar body to be immersed in the liquid the viscosity of which is to be determined, and to move such body in the liquid against the resistance of its inertia and to simultaneously measure the speed of movement of such body in the liquid, the principle of my invention being demonstrated in the drawings, in which—

Figure 2:
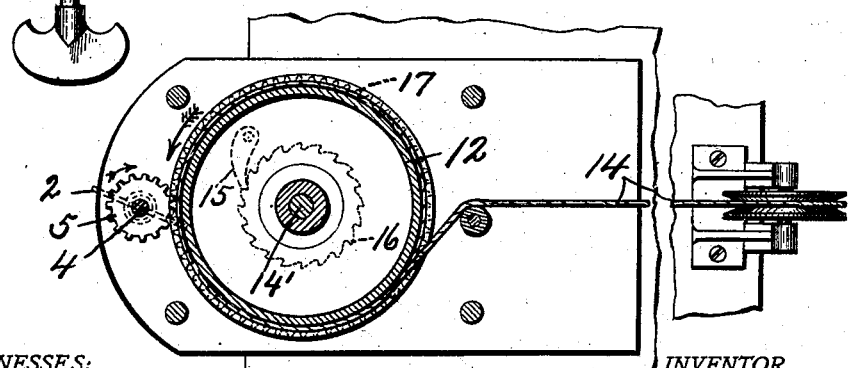

Figure 1 is a side elevation, partly in section, of the preferred mechanism for carrying out the objects previously stated. Fig. 2 is a horizontal sectional view taken on line 2 2, Fig. 1.

Similar reference characters indicate corresponding parts in both views.

As previously stated, the principle of my invention lies in the immersion and movement of a substantially flat body, such as a blade or paddle, in the liquid and to indicate by some suitable means the speed of movement of said body, which of course determines the degree of resistance or inertia of the liquid.

In the preferred form of my invention I have shown a receptacle 1 for the liquid, a blade or paddle 2, means to rotate the blade or paddle, and additional means to indicate the speed of rotation of said blade or paddle. The receptacle 1 may be of any desired form or size adapted to receive the viscous liquid, as 3, to be tested. The blade or paddle 2 is immersed in the liquid to a predetermined depth and is preferably mounted upon a suitable rotary shaft 4, provided with a pinion 5 and actuated by a suitable driving mechanism, hereinafter described, said shaft being supported in any manner, here shown as consisting of bearings 6 and 7, forming a part of the frame which supports the driving mechanism.

In this device it is desirable that the blade or paddle be immersed in the different liquids tested a uniform depth, and I therefore make one or more of the parts—in this instance the receptacle—adjustable and provide the other part, as a shaft 4, with an indicator-shoulder 8, which may, if desired, be adjustable along the shaft in order that the depth of immersion of the blade may be varied, if desired, in which instance the shaft is provided with suitable graduations to determine the exact distance from the bottom of the blade to the indicator-shoulder 8.

In order to permit the adjustment of the receptacle 1, I preferably mount the same upon a suitable platform 9, which is supported upon an adjusting-screw 10, adjustably mounted in a fixed bearing 11 of any desired construction, not necessary to herein further illustrate or describe.

Any desired form of driving mechanism may be employed to rotate the shaft 4; but for convenience of illustration I have shown the rotary drum 12, actuated by a weight 13 or equivalent device, and cable 14, which is wound upon the drum to rotate the same in one direction as the weight descends. This drum is secured to a shaft 14' and is provided with a pawl 15 (shown by dotted lines in Fig. 2) and engaged with a ratchet 16, which is loosely mounted on the shaft 14' and connected to a gear 17, meshing with the pinion 5, whereby motion is transmitted from the drum 12 to the shaft 4. When the cable is unwound to its extreme limit, it becomes necessary to rewind the same, and I therefore provide the shaft 14 with a hand-crank 18, which when turned in the direction opposite to the direction of the rotation of the drum by means of the weight 13 rewinds the cable 14 upon the drum 12, whereupon the driving mechanism is again ready for automatic action.

In order that the driving mechanism may be held from operation, I provide the spindle 4 with a circular rack 19, the teeth of which are engaged by a movable detent 20, mounted upon the supporting-frame of the driving mechanism and provided with a handpiece 21, by which the detent may be moved into and out of operative position.

Various devices may be connected to the paddle-spindle 4 for indicating the speed of revolution of the paddle to indicate the degree of resistance offered by the viscous liquid; but I have shown a simple indicating mechanism consisting of a worm 22, meshing with a pinion 23, to which is secured an indicating-finger 24, movable around a suitable dial 25, these parts being so relatively constructed and arranged that a number of the revolutions of the spindle 4 is necessary to produce a single revolution of the indicating-finger 24. In this instance the comparative number of revolutions is about twenty to one; but it is evident that by changing the sizes of the pinion 23 the comparative number of revolutions of the spindle 4 and indicating-finger 24 may be increased or diminished.

I have thus far described a rotary body moving in the liquid; but it is evident that other movements of the paddle or blade may be employed within the scope of my invention. It is evident also that other forms of paddle or blade may be moved in the liquid by other means than that shown, and I do not limit myself to the specific form of driving mechanism nor blade, the broad invention lying in the movement of a paddle or blade in a viscous liquid.

In the operation of my invention, referring to Fig. 1, the drum is first set to elevate the weight to its highest point, is then released by the operator, whereupon the weight acts upon the drum through the medium of the cable 14, pawl 15, ratchet 16, and gears 5 and 17 to rotate the shaft 4 and paddle 2. This rotates the indicator-finger 24 around the dial 25, and by observing the starting-point of the indicator at a given time the exact number of revolutions of the paddle 2 may be ascertained at each revolution of the indicator-finger 24. For example, suppose the indicator-finger normally started at zero and when desired to ascertain how many revolutions the blade 2 will make in a predetermined time—as, for instance, one minute—then by observing the time at the beginning of the movement of the indicator-finger and then again noting the position of the indicator-finger at the end of one minute the exact number of revolutions of the blade for one minute can readily be computed.

It is necessary to have some certain base from which to compute the comparative viscosities of the various liquids tested, and the apparatus is tested first with this base—such as water, for example—in which it has been previously ascertained that the paddle or blade will make a certain number of revolutions for a given time—such as a minute—and this fact being noted the tests of the viscosity of other liquids are also noted and a comparison made with the speed of movement of the blade in the liquid taken as a standard, as water. This shows the comparative resistances or inertia of the different liquids tested, and the desired viscosity may be readily determined, it being understood that the more sluggish the liquid the more resistance is offered to the movement of the blade or pawl, and therefore the less number of revolutions it will make in a given period of time, while the nearer the viscosity of the liquid approaches the viscous properties of the base or standard liquid the greater will be the number of revolutions for a given period of time.

Having thus described my invention, what I claim, and desire to secure by Letters Patent, is—

1. A viscosimeter comprising a receptacle for the liquid a frame, a shaft journaled therein, a movable blade adapted to rotate in said receptacle secured to the shaft, adjusting means for varying the relation of one of the parts to the other to regulate the depth of immersion of the blade, and means for rotating said blade, substantially as described.

2. A device for measuring the comparative viscosity of liquids comprising a blade adapted to be immersed in the liquid, means to rotate the same, a speed-indicator for said blade, a receptacle for the liquid, means whereby said receptacle may be adjusted with relation to the blade to regulate the immersion of the blade in the liquid, substantially as described.

3. In a device of the character described, the combination of a frame, a shaft journaled therein, means for rotating said shaft, a blade secured to one end of said shaft, a receptacle for a liquid, said blade adapted to be immersed in the liquid, and means for adjusting the receptacle to regulate the depth of the blade in the liquid, substantially as described.

4. In a viscosimeter, the combination of a receptacle for liquid, a blade adapted to be immersed in the liquid therein, means to indicate the depth of the blade, means to rotate the blade, and means to secure a uniform immersion of the blade by adjusting the relation of the receptacle to the blade, substantially as described.

5. In a device of the character described, comprising a receptacle for the liquid, a blade adapted to be immersed in the liquid, means for rotating the blade, means to indicate the speed of rotation thereof, means to indicate the depth of the blade, and means for adjusting the relation of one part to another to determine the depth of immersion of the blade, substantially as described.

6. In a device for determining the viscosity of liquids a receptacle for the liquid, a blade movable in the liquid, means for adjusting one of the parts relatively to the other to determine the depth of immersion of the blade in the liquid, means to move the blade and additional means to indicate the speed of movement of the blade.

7. A viscosimeter, comprising a receptacle for the liquid, a rotary member adapted to be immersed in the liquid, means for rotating the same, and means for adjusting the receptacle with relation to the blade to secure a determined immersion of the blade, substantially as described.

8. A device of the type set forth, comprising a receptacle for the liquid, a rotary member adapted to be immersed in said liquid, means for indicating the depth of immersion of the same, means for rotating the said member, means for indicating the speed thereof, and adjusting means for varying the relation of the receptacle to said rotary member in order to determine the depth of the immersion of the rotary member in the liquid, substantially as described.

9. A viscosimeter comprising a receptacle for the liquid, a flat blade immersed in the liquid, means to rotate the blade, and an indicator actuated by said member for the purpose set forth.

10. A viscosimeter comprising a receptacle for the liquid, a flat blade immersed in the liquid, means to rotate the blade, and an indicator actuated by said member and means to indicate the depth of immersion of the blade in the liquid.

In witness whereof I have hereunto set my hand this 22d day of July, 1902.

SAMUEL GRAND.

Witnesses:
M. A. FREEMAN,
CLAUDE E. GUILE.